United States Patent
Pfeffer

Patent Number: 5,389,121
Date of Patent: Feb. 14, 1995

[54] COMPOSITE OF LAYERS OF GLASS FIBERS OF VARIOUS FILAMENT DIAMETERS

[76] Inventor: Jack R. Pfeffer, 4295 Country Club Dr., Bakersfield, Calif. 93306

[21] Appl. No.: 103,518

[22] Filed: Aug. 9, 1993

[51] Int. Cl.⁶ .............................................. B01D 39/06
[52] U.S. Cl. ....................................... 55/487; 55/524; 55/527; 264/258; 264/DIG. 48; 428/218; 428/288; 428/302; 428/325
[58] Field of Search ................. 55/524, 527, 528, 523, 55/485-489; 65/4.4; 428/218, 302, 325, 338, 288; 264/257, 258, DIG. 48

[56] References Cited

U.S. PATENT DOCUMENTS

| | | | |
|---|---|---|---|
| 2,728,699 | 12/1955 | Labino | 428/338 |
| 2,961,698 | 11/1960 | Rea | 65/4.4 |
| 3,262,578 | 7/1966 | Dennis | 210/489 |
| 3,690,852 | 12/1969 | Smith et al. | 55/485 X |
| 4,201,247 | 5/1980 | Shannon | 428/302 X |
| 4,463,048 | 7/1984 | Dickson et al. | 428/218 |
| 4,661,132 | 4/1987 | Thornton et al. | 264/DIG. 48 |
| 4,765,915 | 8/1988 | Diehl | 55/527 X |
| 4,772,443 | 9/1988 | Thornton et al. | 264/DIG. 48 |
| 4,784,892 | 11/1988 | Storey et al. | 55/527 X |
| 4,983,193 | 1/1991 | Tani et al. | 55/524 X |
| 5,221,573 | 6/1993 | Baigas, Jr. | 55/524 X |

*Primary Examiner*—Richard L. Chiesa
*Attorney, Agent, or Firm*—William W. Haefliger

[57] ABSTRACT

The disclosure of this invention describes a composite glass fiber structure that includes first and second layers of glass fibers extending in adjacent parallel relation; synthetic resin coating the fibers of each layer and providing a bond holding the layers together in the parallel relation; the fibers of the first layer having smaller diameters than the fibers of the second layer; the first and second layers being gas compressed to have densities of between about 0.25 and 0.45 lbs. per cubic foot.

9 Claims, 2 Drawing Sheets

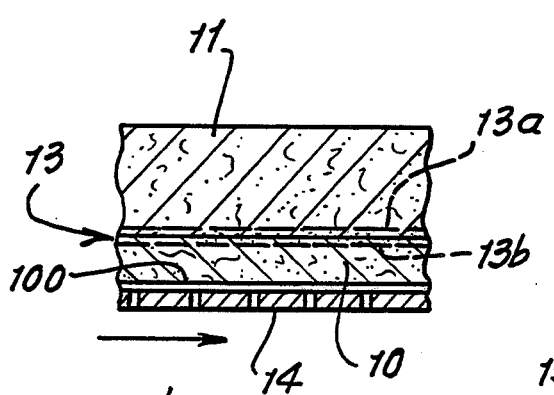
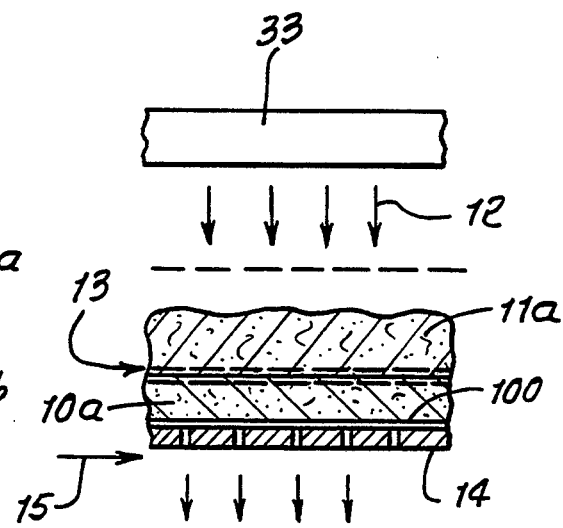
Fig. 1a.  Fig. 1b.
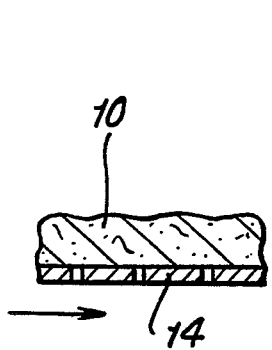 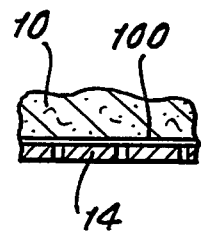 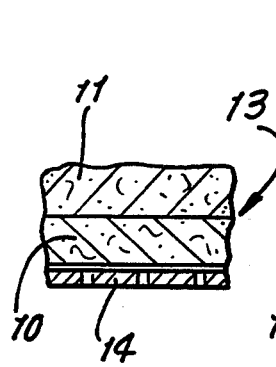 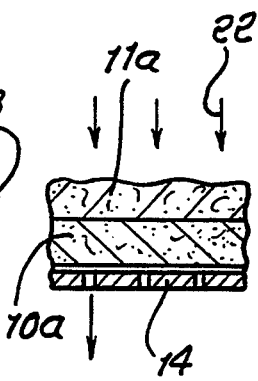
Fig. 2a.  Fig. 2b.  Fig. 2c.  Fig. 2d.

COMPOSITE OF LAYERS OF GLASS FIBERS OF VARIOUS FILAMENT DIAMETERS

BACKGROUND OF THE INVENTION

This invention relates generally to forming of, and to formed, glass fiber composites, as are used in high-efficiency air filtration; and more particularly the invention concerns a glass fiber filter media composite wherein glass fibers have various diameters to produce distinct advantages.

There is need for longer-life filters capable of efficiently filtering particulate from gas streams, and there is need for efficient, effective methods of producing such filters. The disclosure of U.S. Pat. No. 3,690,852, incorporated herein by reference, concerns production of a filter comprising two layers of fibers of different sizes. The present invention improves upon the filter described in that patent, as will be seen.

SUMMARY OF THE INVENTION

It is a major object of the invention to provide an improved filter comprising gas compressed, superimposed layers of fibers, and meeting the above need.

Basically, the glass fiber structure of the invention comprises:
 a) first and second layers of glass fibers extending in adjacent parallel relation,
 b) synthetic resin coating the fibers of each layer and providing a bond holding the layers together in the parallel relation,
 c) the fibers of the first layer having smaller diameters than the fibers of the second layer,
 d) the first and second layers being gas compressed to have densities of between about 0.25 and 0.45 lbs. per cubic foot.

Another object is to provide the first layer fibers to have diameters of about 0.00004 inch, and second layer fibers to have diameters of about 0.0001 inch.

Yet another object is to provide the first fine fiber layer with density of about 0.25 to 0.45 lbs. per cubic foot; and the second coarse fiber layer to have density of about 0.25 to 0.45 lbs. per cubic foot.

An added object is to provide a filter, as described, wherein the first and second layers have particulate retention relative capacities of about 95 and 85, respectively.

These and other objects and advantages of the invention, as well as the details of an illustrative embodiment, will be more fully understood from the following specification and drawings, in which:

BRIEF DESCRIPTION OF THE DRAWINGS

FIG. 1a is a section taken through first and second groups of fibers extending in side-by-side relation;

FIG. 1b is a view like FIG. 1a but showing controlled gas flow through the fibers of the first and second groups, to control overall thickness reduction;

FIG. 2a is a section taken through a first group of fibers traveling on a support conveyor;

FIG. 2b is a view like FIG. 2a but also showing use of a thin support layer or sheet for the lower fiber group or layer;

FIG. 2c is a view like FIG. 1a showing a second group of fibers applied onto the compressed fibers of FIG. 2b; and FIG. 2d is a view like FIG. 1b showing the upper group of fibers being gas (air) pressure compressed;

DESCRIPTION OF THE PREFERRED EMBODIMENT

Figure 3:
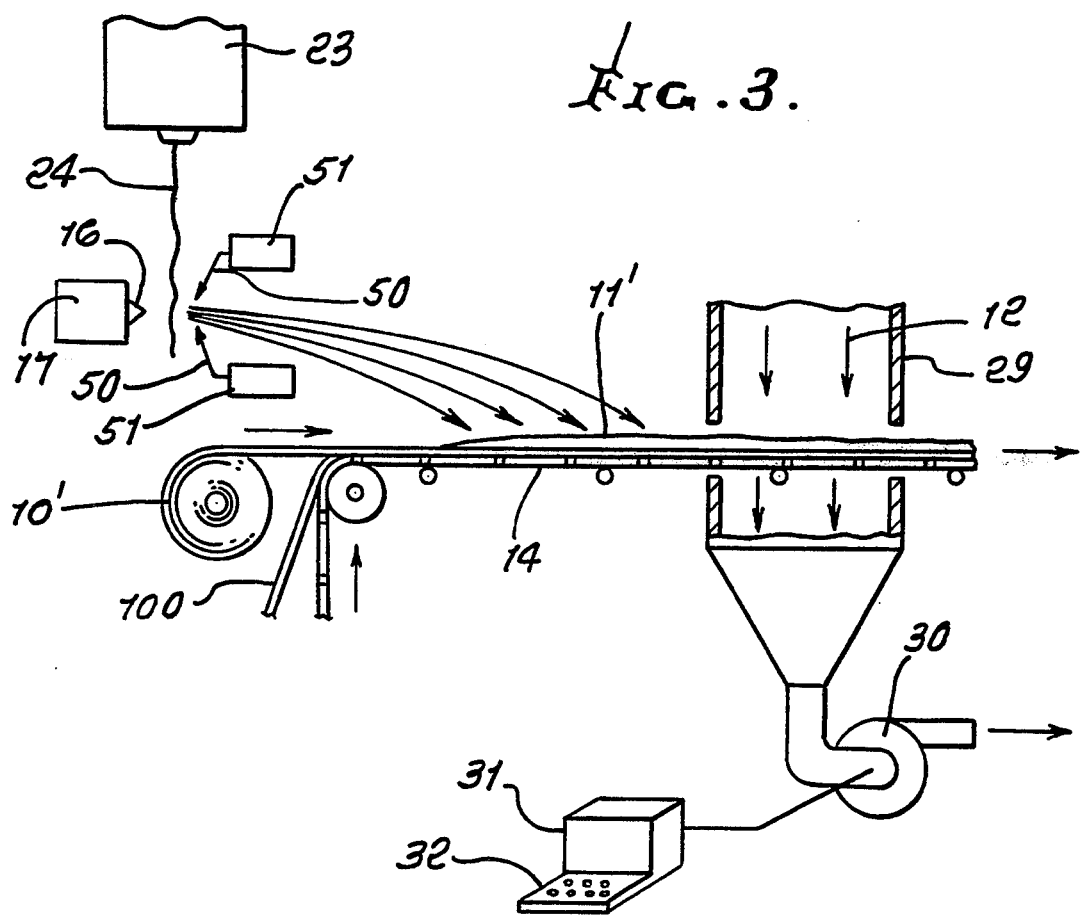
FIG. 3 is a view of apparatus to produce the two fiber group composite.

The method of forming the fibrous composite includes forming first and second layered or mat-like groups 10 and 11 of glass fibers extending in side-by-side relation, as in FIG. 1a; and passing gas through the groups of fibers to effect controlled reduction in overall thickness of the two groups of fibers, as for example to the resultant condition seen in FIG. 1b.

Arrows 12 indicate controlled flow of gas, such as air, through the groups or layers of fibers, to reduce group or layer 11 to the indicated reduced thickness form 11a. Layer 10 was typically preformed to the air pressure, compressed condition and thickness, as shown, the fibers therein bonded together by application of synthetic resin to the fibers as they are blown or formed, and laid down as layer 10a, the resin then curing. Layer 11 is then deposited on layer 10, as in FIG. 1a. The gas flow and pressure controlling source is seen at 33 in FIG. 1b. In this example, gas flows through both groups of fibers, simultaneously, and through a perforate conveyor 14 of Nylon cloth conveying the fiber groups rightwardly as indicated by arrow 15. In addition, preformed layer 10 may be laid down upon a thin, flexible layer 100 of porous material (as for example CEREX), acting as a flexible support for layer 10 and also containing (preventing escape of) very small diameter glass fibers in 10, which can tend to break. Layer 10 is not appreciably compressed by the air flow, since it was preformed. Layer 100 has a surface weight of between 0.4 and 0.5 oz. per square yard, its thickness being between 0.002 and 0.005 inch.

A boundary zone of intermingling of the fibers in the two groups 10 and 11 is indicated at 13, i.e., between the parallel broken lines 13a and 13b. Bonding of fibers in that zone is also effected, as by application of synthetic resin to fibers in that zone, and curing of such resin for coating the intermingled fibers in that zone. For that purpose, all of the fibers (which may consist of glass) may be coated with synthetic resin as the fibers are formed, as described in connection with FIG. 3 herein. The resin-coated fibers at the bottom of layer 10 bond to the thin support layer 100 if the latter is employed.

Typically, the relatively more fine fibers in the first group 10 have lesser diameters, as for example about 0.00004 inches; and the relatively more coarse fibers in the second group 11 have larger diameters, as for example about 0.0001 inches. Fibers in group 10 can range in diameter from 0.00002 to 0.00005 inch; and fibers in group 11 can range in diameter from 0.00006 to 0.00015 inch.

More importantly, gas passage through the two groups of fibers is effected to cause the density of the second group 11 of fibers to increase to about 0.25 to 0.45 lbs. per cubic foot. The first group 10 of fibers already has a density within that range as a result of having been preformed. Also, such gas passage through the two groups of fibers is carried out to compress the fiber groups into adjacent layers of predetermined thickness, according to the following:

|  | Initial Thickness | Final Thickness |
| --- | --- | --- |
| GROUP 10 | $t_1$ | $t_2$ (where $t_2 \approx t_1$) |
| GROUP 11 | $t_3$ (where $t_3 > t_1$) | $t_4$ (where $t_4 < t_3$ and $t_4 > t_2$) |

In the above, $t_2$ is typically 0.45 to 0.55 $t_4$.

Figure 4:
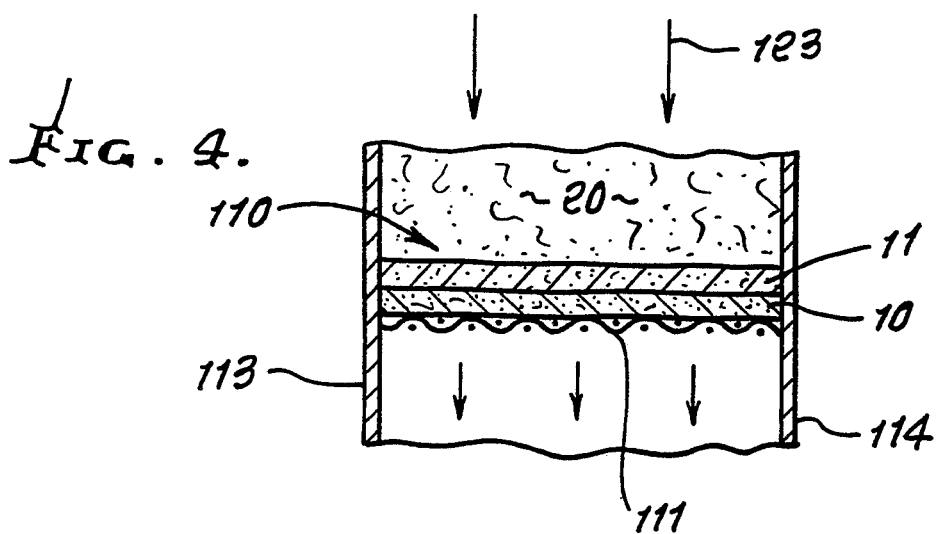
FIG. 4 is a section showing the resultant two fiber group composites in filter use mode.

Of further importance is the step of effecting the gas passage through the groups of fibers to compress the groups into adjacent layers wherein the first (fine fiber) and second (coarse fiber) layers have particle retention relative capacities of 95 and 85, respectively, when a particulate carrying gas stream is passed into the second layer and then into the first layer. See in this regard FIG. 4 showing a particulate conveying gas stream 20 passed first into the second filter layer 11, and then into and through the first layer 10, layer 11 having 85% particle retention capacity, and layer 10 having 95% particulate retention capacity, for the particular stream 20 being filtered.

In this regard, smaller voids are formed between fibers in layer 10 than in layer 11, whereby the largest particles are retained on filter layer 11, to prevent those particles from completely closing off the smaller voids between fibers in the layer 10. The larger surface area, together with the relatively larger openings provided by the coarser fibers in layer 11, enables a large amount of particulate material to be collected by layer 11 without "masking off" the filter, which would otherwise render the filters inoperative. In this regard, the sizing of the filter voids can be "tailored" to the particulate stream to be filtered by controlled compression of the two layers 11 and 10, by the air or gas stream 12. The latter also aids in curing the bonding material applied to the fibers, and the application of air can be continued until the layers 11 and 10 retain their desired thickness, as related to retention of particles in the stream to be filtered, due to curing of the resin tending to hold the fibers in controlled, compressed condition.

FIG. 2a shows only the preformed layer 10, as applied to the perforate conveyor 14; and FIG. 2b is like FIG. 2a but also shows alternative use of thin porous and protective support 100 beneath 10. Next, layer 11 is applied to compressed layer 10, as in FIG. 2c; and FIG. 2d shows controlled flow 22 of air (or other gas) through both layers to control overall thickness to selected or controlled extents, i.e., to forms 10a and 11a, where layer 11a is substantially reduced in thickness, and layer 10a has substantially the same thickness as layer 10. Precompression of layer 10 and compression of layer 11, as described, results in the relative differential 95% and 85% particle retention capacities referred to above.

FIG. 3 is a view partly similar to FIG. 2 in U.S. Pat. No. 3,690,852. A stream or streams 24 of molten glass are drawn downwardly from an orifice or orifices in a glass melt tank 23. Hot gas jets produced by burners 17 melt the fiber or fibers 24 to attenuate them into finer fibers displaced or blown rightwardly as shown, in group 11', to deposit on layer 10. Layer 10 is supplied off a roll 10' and onto the conveyor 14. Layer 10 was preformed in the same manner that layer 11 is formed from a stream of glass fibers 24. Resin is supplied at 50, as by spraying into the blown fibers, from source 51. Controlled air flows downwardly at 12, between channel walls 29, as produced by intake of a blower 30. The latter is motor driven at 31, and a keyboard control 32 selectively controls motor speed, to in turn control blower speed, and pressure and flow rate of air in stream 22. Thus, input to the keyboard determines the ultimate thicknesses of the two compressed layers 10 and 11 in the filter, and the filtering capability of the latter, as related to a particulate stream to be filtered.

The particulate-carrying stream may be initially sampled to determine average particle sizes, which the user can then relate to input at 32 to tailor the filter to the filtering task to be accomplished.

The ultimate composite glass fiber filter to be produced comprises:
- a) first and second layers of glass fibers extending in adjacent parallel relation,
- b) synthetic resin coating the fibers of each layer and providing a bond holding the layers together in said parallel relation,
- c) the fibers of the first layer having smaller diameters than the fibers of the second layer,
- d) the fiber in both layers having densities between 0.25 and 0.45 lbs. per cubic foot.

FIG. 4 shows use of the filter 110 comprising layers 10 and 11, as referred to, supported as by a screen 111 in a duct or channel having walls 113 and 114. Particulate in the gas to be filtered is shown at 20, the glass flow direction indicated at 123.

Advantages of the method and resultant multi-layer filter media includes: high efficiency of operation in terms of dust or particle retention capacity; abuse-resistant media surface, i.e., the filter is more readily compatible with fabrication into filter apparatus; the upper layer 11 glass fibers are coarse enough that they won't be injected into the air stream being filtered, thereby mitigating health concerns; and retention of finer fibers in layer 10 "inside" the media package, i.e., sandwiched between layers 11 and 100, to block their escape.

I claim:

1. A composite glass fiber structure, comprising
   - a) first and second layers of glass fibers extending in adjacent parallel relation,
   - b) synthetic resin coating the fibers of each layer and providing a bond holding the layers together in said parallel relation,
   - c) the fibers of the first layer having smaller diameters than the fibers of the second layer,
   - d) the first and second layers being gas compressed to have densities of between 0.25 and 0.45 lbs. per cubic foot,
   - e) and including a support layer of thin, flexible, porous material extending sidewardly adjacent said first layer whereby the first layer is sandwiched between said support layer and said second layer, said support layer having a thickness between 0.002 and 0.005 inch, and a surface weight between 0.4 and 0.5 oz. per square yard.

2. The composite structure of claim 1 wherein said first layer fibers have diameters of about 0.00004 inch.

3. The composite structure of claim 1 wherein the second layer fibers have diameters of about 0.0001 inch.

4. The composite layer of claim 1 wherein the first layer fibers have diameters between 0.00002 and 0.00005 inch, and second layer fibers have diameters between 0.00006 and 0.00015 inch.

5. The composite structure of claim 1 wherein said first layer is precompressed by air flow therethrough to mat form, and the resin coating the fibers of the first layer is cured, and the second layer is compressed by air flow therethrough and through the first layer, the resin coating certain fibers of the second layer acting to bond the second layer to the first layer.

6. The composite structure of claim 1 wherein said first and second layers have particulate retention relative capacities of about 95 and 85, respectively.

7. The composite structure of claim 6 wherein each of said first and second layers has a density of between 0.25 and 0.45 lbs. per cubic foot.

8. The composite structure of claim 1 wherein said first and second layers have thicknesses $t_2$ and $t_4$, respectively, and where $t_2$ is 45% to 55% of $t_4$.

9. The composite structure of claim 1 wherein each of said first and second layers has a density of between 0.25 and 0.45 lbs. per cubic foot.

* * * * *